July 26, 1960  K. K. D. JIN  2,946,941
ELECTRIC MOTORS

Filed May 7, 1959  2 Sheets-Sheet 1

INVENTOR.
Korda K. D. Jin
BY
ATTORNEYS

July 26, 1960

K. K. D. JIN 2,946,941

ELECTRIC MOTORS

Filed May 7, 1959

INVENTOR.
Korda K. D. Jin
BY
ATTORNEYS

United States Patent Office 2,946,941
Patented July 26, 1960

2,946,941
ELECTRIC MOTORS

Korda K. D. Jin, Elyria, Ohio, assignor to The General Industries Company, Elyria, Ohio, an Ohio company Filed May 7, 1959, Ser. No. 811,632

11 Claims. (Cl. 318—223)

This invention relates to improvements in electric motors and more particularly to improvements in fractional horsepower, shaded pole, induction motors.

The primary object of this invention is to provide an improved, two-speed motor of the above type.

Another object of this invention is to provide such a motor which can be wired, according to the principle of this invention, to operate at two speeds either in the same or in alternate directions.

Still another object of this invention is to provide a motor of the above type wherein two speeds are attained by a simple switch of the main windings.

Yet another object of this invention is to provide a motor incorporating the above features which is simple and economic to manufacture and highly efficient in use.

Other objects of this invention and the invention itself will be understood from the following specification and the accompanying drawings, in which said drawings.

Figure 1:
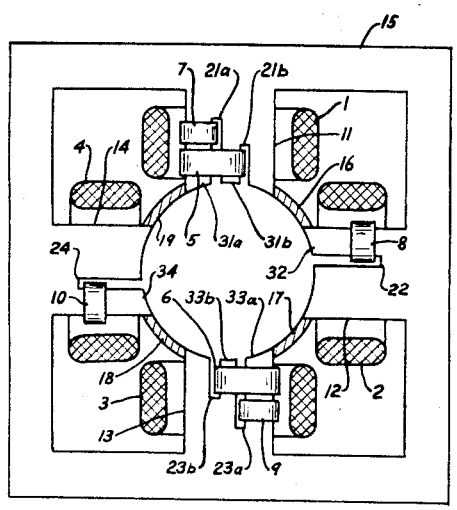
Fig. 1 is a sectional view of a two-speed, unidirectional motor adapted to operate as either a two or four pole motor.

Referring now to the figures of the drawings in all of which like parts are designated by like reference characters, in Fig. 1 there is shown an electric motor having four main field coils designated 1, 2, 3, and 4, said coils respectively surrounding field poles 11, 12, 13 and 14. The poles 11–14 are integrally joined at their outer ends by means of a field yoke 15 and are connected at their inner ends by means of magnetic bridges 16, 17, 18, and 19.

The field pole 11 is longitudinally slotted from its inwardly directed, peripheral edge to provide a relatively long slot 21a and a laterally spaced, relatively shorter slot 21b. The field pole 13 is similarly provided with a long slot 23a and a relatively shorter slot 23b. The field poles 12 and 14 are provided with long slots 22 and 24 respectively, corresponding in length to the slots 21a and 23a of the field poles 11 and 13. By means of the slots 21a, 22, 23a, and 24 the field poles 11–14 are provided with relatively longer supplemental poles 31a, 32, 33a, and 34 respectively. The slots 21b and 23b of the field poles 11 and 13 provide relatively shorter supplemental poles 31b and 33b which are interposed between the supplemental poles 31a and 33a and the remainder of said field poles. Wire wound shading coils 7, 8, 9, and 10 are telescoped over the longer supplemental poles 31a, 32, 33a, and 34 respectively, and similarly wirewound shading coils 5 and 6 are telescoped over the inwardly directed ends of the pairs of supplemental poles 31a—31b and 33a—33b respectively of the main field poles 11 and 13.

From the above it will be seen that an armature (not shown), when mounted centrally of the main field poles, will be caused to rotate in a counter-clockwise direction by the shading coils 5—10 according to well known principles of providing starting torque and determining direction of rotation in motors of this type. Magnetic bridges are provided between the main field poles as indicated at 16, 17, 18 and 19.

Figure 2:
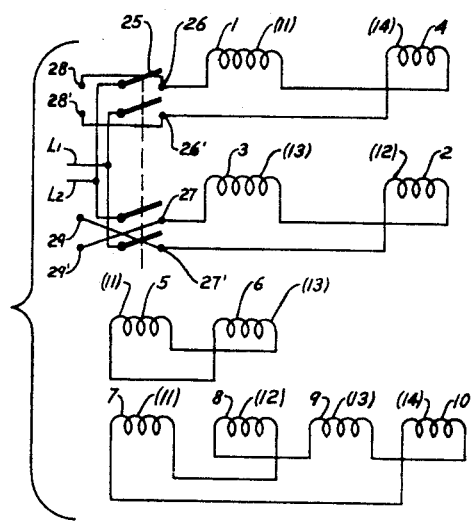
Fig. 2 is a diagram of the circuit of the motor shown in Fig. 1.

Referring now to Fig. 2 wherein I have indicated in parentheses the number of the main pole associated respectively with each coil, it will be noted that the main field coils are connected in pairs, 1 and 4, and 3 and 2, whereby current passing therethrough will cause the associated poles to have relatively opposite polarities. Current for said main field coils is provided through leads L1 and L2 connected to a four-pole, double throw switch 25. The switch 25 is adapted to contact pairs of terminals 26—26' and 27—27' in one direction and terminals 28—28' and 29—29' when moved in the opposite direction. The terminals 26—26' and 28—28' are adapted to complete the circuit to the main field coils 1 and 4 and it will be noted that the polarity in said coils remains the same regardless of which pair of terminals is being contacted. However, it will be noted that the pairs of terminals 27—27' and 29—29' are cross-connected whereby the polarities in the coils 2 and 3 are reversed each time the switch moves from one pair of terminals to another.

The shading coils 5 to 10 are not connected into the electrical circuit and receive induced current only from their respective poles. The shading coils 5 and 6 are interconnected or short-circuited whereby when the poles 11 and 13 are of like polarity, the voltages induced in said shading coils will be in opposition whereby their magnetomotive forces cancel each other out, and when said poles are of unlike polarity, said induced voltages will be additive. When the shading coils 5 and 6 are additive, they perform the same function as conventional shading coils and when they are in opposition they have no effect upon the motor operation.

The shading coils 7, 8, 9, and 10 also receive only induced current and are all interconnected whereby when the poles 11, 12, 13, and 14 are of alternate polarity, the voltages induced in said coils are additive, and when the polarities in said field coils are alike in adjacent pairs, the voltages in said shading coils 7—10 are in opposition.

It will be understood, therefore, that the sets of shading coils 5—6 and 7—10 are not interconnected and that the effectiveness or ineffectiveness of each set is determined by the polarities of the main field poles 1—4.

The electrical circuit as shown in Fig. 2 is so arranged that the motor can be run optionally at either of two predetermined speeds either as a four-pole or a two-pole motor. The ratio between the two speeds will be approximately two to one with the two-pole operation representing the faster speed.

When the switch 25 is thrown to the right as shown in the diagram, contact is made with the terminals 26—26' and 27—27' whereby the field coils 1, 2, 3, and 4 induce currents of alternate polarities in the respective field poles 11, 12, 13, and 14. In this instance, the voltages induced in the shading coils 7 to 10 will be additive whereas the voltages induced in the shading coils 5 and 6 will be in opposition and the motor will operate as a four-pole motor.

When the switch 25 is moved to the left whereby it contacts the terminals 28—28' and 29—29', the poles 13 and 12 which are associated with the field coils 3 and 2 respectively will be reversed in their polarity. Poles 11 and 12 will then be of like polarity. The voltages induced in the shading coils 5 and 6, due to the opposite polarities of the poles 11 and 13, will then be additive whereas the voltages induced in the shading coils 7 to 10 will be in opposition. The motor will then operate as a two-pole motor with the poles 11 and 12 acting as one single pole and the poles 13 and 14 acting as another single pole. Under these conditions, the shading coils 5 and 6 will provide the starting torque for the motor and determine the direction of rotation thereof.

To attain the best performance, the shading coils which are effective during two-pole operation preferably encompass more than one-half of the pole pitch, and those shading coils which are effective during four-pole operation preferably encircle approximately one-third of the total pole pitch. However, these proportions may be varied without making the motor inoperative.

Figure 3:
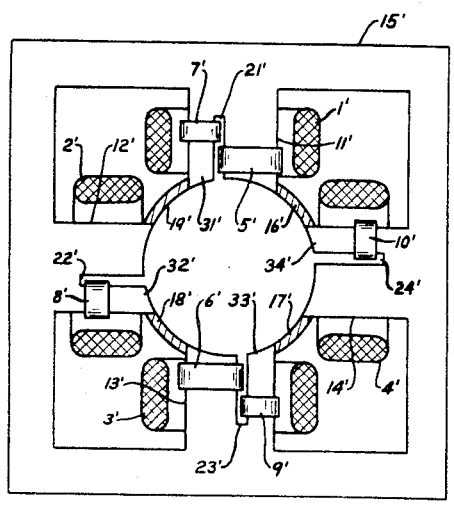
Fig. 3 is a view similar to Fig. 1 showing a two-speed, bidirectional motor.
Figure 4:
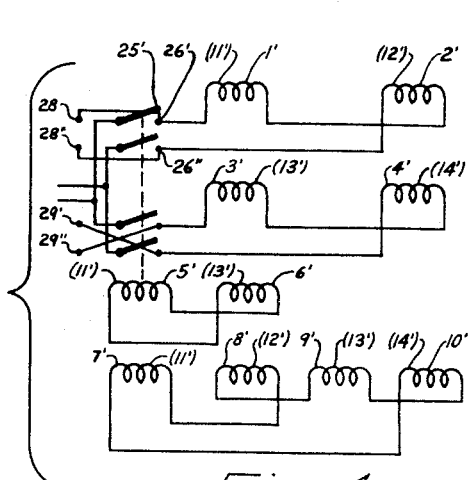
Fig. 4 is a diagram of the electrical circuits of the motor shown in Fig. 3.

In Figs. 3 and 4 there is shown a modification of the motor of Figs. 1 and 2 which is generally similar in construction but which is adapted as a two-speed, reversible motor. Generally, the reversible motor operates as a four-pole motor when rotating in a counter-clockwise direction and operates as a two-pole motor when rotating in a clockwise direction as seen in Fig. 3. The same numbers have been used to designate the parts in this second embodiment as were used in the first embodiment with the exception that all numbers in said second embodiment are primed.

The motor of Fig. 3 comprises four field poles 11', 12', 13', and 14' joined at their outer ends by means of a field yoke 15' and at their inner ends by means of magnetic bridges 16', 17', 18', and 19'. The field poles 11'–14' are respectively energized by field coils 1', 2', 3', and 4'. The poles 11' to 14' are respectively slotted at 21', 22', 23', and 24' and thereby have supplemental poles 31', 32', 33', and 34'. Wire wound shading coils 7', 8', 9', and 10' are respectively telescoped over the supplemental poles 31', 32', 33', and 34'. Wire wound shading coils 5' and 6' are respectively telescoped over the remaining portions of the poles 11' and 13', said coils 5' and 6' being positioned in a clockwise direction from the associated supplemental poles 31' and 33'. By referring to Fig. 4, it will be noted that the wiring diagram for the second embodiment is substantially similar to that of the first embodiment with the exception that the poles 12' and 14' have been interchanged.

A four-pole, double throw switch 25' is provided which is substantially similar to the switch 25 of Fig. 2. The switch 25' is adapted to be moved between two alternate positions whereby it contacts either the pairs of terminals 26'—26'' and 27'—27'' or the alternate pairs of terminals 28'—28'' and 29'—29''. As in the first embodiment, the poles 11' and 12' retain the same polarities in either position of said switch. The terminals 27'—27'' and 29'—29'' are, however, cross-connected whereby the polarities of the poles 13' and 14' are reversible.

When the switch 25' is thrown to the right as shown in Fig. 4, the poles 11' to 14' are of alternate polarity, the shading coils 5' and 6' are in opposition, and the shading coils 7' to 10' are additive whereby the motor will rotate in a counter-clockwise direction as a four-pole motor. When the switch 25' is thrown to the left, the polarities of the poles 13' and 14' are reversed whereby poles 11' and 14' act as a single pole of one polarity and poles 12' and 13' act as another single pole having the opposite polarity. The shading coils 7' to 10' are thereby in opposition and the shading coils 5' and 6' are additive whereby the motor will operate in a clockwise direction as a two-pole motor.

Figure 5:
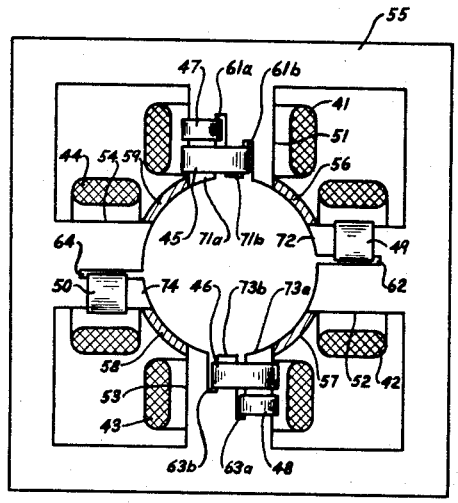
Fig. 5 is a view similar to Fig. 1 showing a modified form of a two-speed, unidirectional motor.
Figure 6:
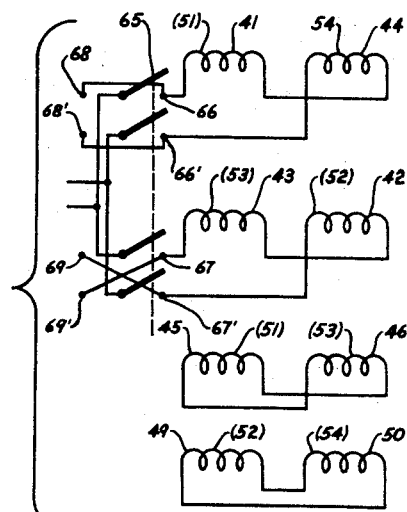
Fig. 6 is a diagram showing the electrical circuit of the motor of Fig. 5.

In Figs. 5 and 6, there is shown a third embodiment of this invention comprising a two-speed, unidirectional motor adapted to operate as a four-pole motor at one speed and a two-pole motor at the other speed. This motor comprises the usual field poles 51, 52, 53, and 54 which are inductively energized by main field coils 41, 42, 43, and 44 respectively. The poles 51 to 54 are unitarily joined by means of a field yoke 55 as in the previous forms of this invention. The field pole 51 is longitudinally slotted at 61a and 61b to provide supplemental poles 71a and 71b, and the pole 53 is similarly slotted at 63a and 63b to provide supplemental poles 73a and 73b. The poles 52 and 54 are slotted at 62 and 64 to provide supplemental poles 72 and 74 respectively. The supplemental poles are so positioned as to cause rotation of an armature (not shown) in a counter-clockwise direction as shown in Fig. 5.

The supplemental poles 71a and 73a are provided with independent short-circuited windings 47 and 48 respectively. These windings are of the conventional type consisting of continuous strips of uninsulated copper encircling the said supplemental poles. The inwardly directed ends of the supplemental poles 71a and 71b are surrounded with a wire-wound shading coil 45, and the inwardly directed ends of the supplemental poles 73a and 73b are similarly provided with a wire-wound shading pole 46. The supplemental poles 72 and 74 are respectively encircled by wire-wound shading coils 49 and 50. The circumferential spaces between the inner ends of the poles are connected by means of magnetic bridges 56, 57, 58, and 59 as in the previous forms of this invention.

Referring now to Fig. 6, the energizing circuit in this form of the invention is the same as that shown in Fig. 2. The main field coils are energized in pairs, 41—44 and 42—43 by means of a four-pole, double throw switch 65 movable between two positions wherein it contacts either the pairs of terminals 66—66' and 67—67' or the pairs of terminals 68—68' and 69—69'. As seen in Fig. 6, when the switch 65 is thrown to the right, the coils 41 to 44 are energized to provide alternate polarities to the poles 51 to 54. When said switch is thrown to the left, the polarities in the poles 52 and 53 are reversed due to the fact that the pairs of terminals 67—67' and 69—69' are cross-connected with each other.

The wire-wound shading coils 45 and 46 are so interconnected that when their corresponding poles are of like polarity, the voltage effects induced therein are in opposition. When the associated poles 51 and 53 are of unlike polarity, the voltage effects in the shading coils 45 and 46 are additive. The shading coils 49 and 50 are so interconnected as to obtain the opposite effect. When the poles 52 and 54 are of like polarity, the induced voltages are additive, and when the polarities of said poles are unlike, the induced voltages in the shading coils 49 and 50 are in opposition.

It will be evident from the above description that when the switch 65 is thrown to the right and the poles 51 to 54 are of alternate polarities the shading coils 45 and 46 will be in opposition and the coils 49 and 50 in combination with the conventional shading coils 47 and 48 will cause the motor to operate as a four-pole motor with the armature rotating in a counter-clockwise direction as shown in Fig. 5. When the switch 65 is thrown to the left and the polarities of the poles 52 and 53 are reversed, poles 51 and 52 are then of like polarity and poles 53 and 54 operate unitarily at the opposite polarity. The shading coils 45 and 46 are then additive and the coils 49 and 50 are in opposition. Poles 51 and 52 will then act as a unit and be of one polarity, and poles 53 and 54 will act as another unit and be of the opposite polarity. Thus, the motor acts as a two-pole motor and the shading coils 45 and 46 are properly positioned relative to said two poles to cause the armature to rotate in a counter-clockwise direction.

Figure 7:
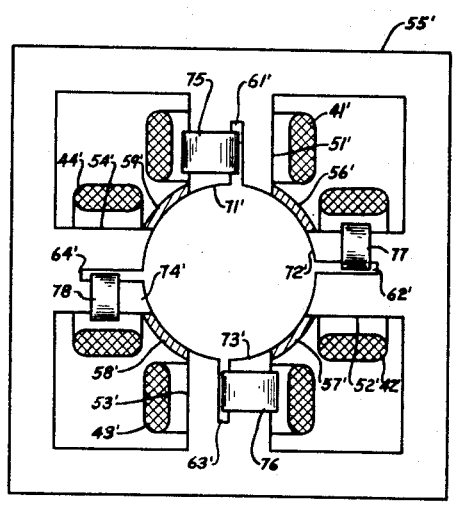
Fig. 7 is a further modification of the motors of Figs. 1 and 5.
Figure 8:
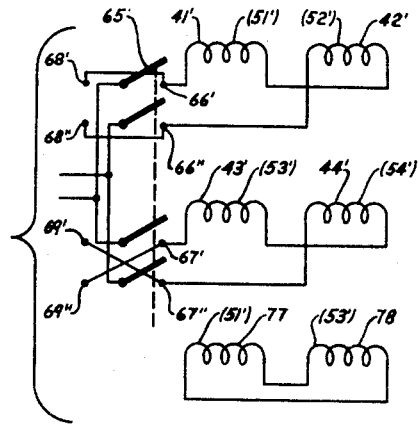
Fig. 8 is a diagram of the electrical circuit of Fig. 7.

In Figs. 7 and 8, there is shown a fourth embodiment of the invention comprising a simplification of the version shown in Figs. 5 and 6. It will be noted that the numbers used in Fig. 7 are similar to those used in Fig. 5 wherever corresponding parts are indicated, the repeated numbers in Fig. 7 being primed. New, unprimed numbers are used wherever the position of parts has been substantially changed.

The motor of Fig. 7 comprises the usual field poles 51', 52', 53', and 54' integrally united by means of the field yoke 55'. The poles are provided with corresponding energizing coils 41', 42', 43', and 44', said coils being connected electrically in the same manner as those shown in Fig. 4. The poles 51' to 54' are respectively slotted as indicated at 61', 62', 63', and 64', and said poles are joined by means of magnetic bridges 56', 57', 58', and 59'. By means of the slots, the poles are provided with supplementary poles 71', 72', 73', and 74'. The supplementary poles 72' and 74' of the field poles 52' and 54' respectively are encircled by conventional shading coils 77 and 78.

Supplemental poles 72' and 74' of the main field poles 52' and 54' respectively are provided with wire-wound shading coils 77 and 78 whose wires are interconnected in series as indicated in the lower part of the diagram of Fig. 8. When the voltages induced in the shading coils 77 and 78 are of like polarity, they are additive and when said voltages are of unlike polarity, said shading coils are in opposition.

The usual four-pole, double throw switch is provided as indicated at 65', and when said switch is thrown to the right as shown in Fig. 8, contact is made with the pairs of terminals 66'—66" and 67'—67" whereby the main field coils are energized to provide the field poles with alternating polarities and the induced voltages in the shading coils 77 and 78 are additive. Movement of the switch 65' to the left to contact the pairs of terminals 68'—68" and 69'—69" reverses the polarities in the main field coils 43' and 44' whereby the poles 52' and 53' will be of one like polarity and the poles 51' and 54' will be of the opposite polarity. This causes the wire-wound shading coils 77 and 78 to be in opposition, and the motor will operate as a two-pole motor with the conventional shading coils 75 and 76 providing the starting torque and determining the direction of rotation of the armature.

From the foregoing it will be understood that in each embodiment of this invention, there is provided at least one pair of interconnected shading coils which may be made either effective or uneffective by changing the polarities of their respective poles. In each instance, switch means are provided for reversing the polarities in two of the coils thereby causing at least one pair of shading coils to become either effective or uneffective with the result that the speed of the motor and/or the direction of rotation of the armature is changed. It will be further understood that with proper design changes, either direction of rotation at either chosen speed can be achieved.

Having thus described this invention in certain particular embodiments, I am aware that numerous and extensive changes therefrom may be made without departing from the spirit thereof or the scope of the appended claims.

What I claim is:

1. An electric motor having a four-pole stator, each pole having an energizing coil and a shading coil, said poles being energized circumferentially with alternate polarities, two of said shading coils being interconnected in series whereby their magnetomotive forces effectively cancel each other when the polarity of the energizing coil associated with one of said shading coils is reversed, and switch means for reversing the polarity of two of said energizing coils including said energizing coil associated with said one of said shading coils.

2. An electric motor having a four-pole stator, each pole having an energizing coil and a shading coil, said poles being energized circumferentially with alternate polarities, two of said shading coils being interconnected in series, switch means connected to two adjacent of said energizing coils to reverse the polarities therein, one of said interconnected shading coils being energized by one of said adjacent energizing coils, said motor operating as a four-pole motor when said poles are of alternate polarity and as a two-pole motor when said two adjacent coils are reversed in polarity, said interconnected shading coils being magnetically additive when said motor operates as a four-pole motor and being magnetically opposed when said motor operates as a two-pole motor.

3. An electric motor having a four-pole stator, said poles having energizing coils connected for alternate polarities in a circumferential direction whereby said motor operates as a four-pole motor, switch means connected to two of said energizing coils for reversing the polarities therein whereby said poles become energized in adjacent pairs of similar polarity, and whereby said motor operates as a two pole motor, a plurality of shading coils associated with said poles, at least two of said shading coils being connected in series at least one of which is energized by one of said reversible energizing coils whereby the magnetomotive forces in said two shading coils are in opposition and inactive when said motor is operating as a two-pole motor, at least two other of said shading coils being active when said motor is operating as a two-pole motor.

4. An electric motor having a four-pole stator, said poles having energizing coils connected for alternate polarities in a circumferential direction whereby said motor operates as a four-pole motor, switch means connected to two of said energizing coils for reversing the polarities therein whereby said poles become energized in adjacent pairs of similar polarity and whereby said motor operates as a two-pole motor, a plurality of shading coils associated with said poles, at least two of said shading coils comprising a continuous wire wound around portions of said poles and interconnected in series, at least one of said wound shading coils being energized by one of said reversible energizing coils whereby the magnetomotive forces in said two shading coils are in opposition when said motor is operating as a two-pole motor, at least two other of said shading coils being active when said motor is operating as a two-pole motor.

5. An electric motor having a four-pole stator, said poles having energizing coils connected for alternate polarities in a circumferential direction whereby said motor operates as a four-pole motor, switch means connected to two of said energizing coils for reversing the polarities therein whereby said poles become energized in adjacent pairs of similar polarity and whereby said motor operates as a two-pole motor, a plurality of shading coils associated with said poles, at least one shading coil on each of said poles being active to provide starting torque when said motor operates as a four-pole motor, at least two of said shading coils being interconnected in series, at least one of said series connected shading coils being energized by one of said reversible energizing coils whereby the magnetomotive forces in said interconnected shading coils are in opposition and said shading coils are inactive when said motor is operating as a two-pole motor, at least two of said plurality of shading coils other than those interconnected being active when said motor is operating as a two-pole motor.

6. An electric motor having a four-pole stator, energizing coils for said poles connected to magnetize said poles with alternate polarities in a circumferential direction whereby said motor operates as a four-pole motor, switch means connected to two of said energizing coils for reversing the polarities therein whereby said poles become magnetized with like polarity in circumferentially adjacent pairs to operate as a two-pole motor, a first set of shading coils comprising a continuous conductor wound upon a portion of each pole and interconnected in series whereby the magnetomotive forces induced therein are additive when said motor operates as a four-pole motor, a second set of shading coils comprising a continuous conductor wound upon a portion of two diametrically opposite of said poles and interconnected in series whereby the magnetomotive forces induced therein are in opposition when said motor operates as a four-pole motor, said first set of shading coils being magnetically opposed and said second set of shading coils being magnetically additive when said motor operates as a two-pole motor.

7. A two-speed electric motor having a four-pole stator, energizing coils for said poles connected to magnetize said poles with alternate polarities in a circumferential direction whereby said motor operates as a four-pole motor at one speed, switch means connected to two adjacent of said energizing coils for reversing the polarities therein whereby said poles become magnetized with like polarity in circumferentially adjacent pairs to operate as a two-pole motor at a relatively higher speed, a first set of shading coils comprising a continuous conductor wound upon a portion of each pole and interconnected in series whereby the magnetomotive forces induced therein are additive when said motor operates as a four-pole motor, a second set of shading coils comprising a continuous conductor wound upon a portion of two diametrically opposite of said poles and interconnected in series whereby the magnetomotive forces induced therein are in opposition when said motor operates as a four-pole motor, said first set of shading coils being magnetically opposed and said second set of shading coils being magnetically additive when said motor operates as a two-pole motor.

8. A two-speed electric motor having a four-pole stator, energizing coils for said poles connected to magnetize said poles with alternate polarities in a circumferential direction whereby said motor operates as a four-pole motor at one speed, with means connected to two adjacent of said energizing coils for reversing the polarities therein whereby said poles become magnetized with like polarity in circumferentially adjacent pairs to operate as a two-pole motor at a relatively higher speed, a first set of shading coils comprising a continuous conductor wound upon a portion of each pole on like circumferential sides of said poles and interconnected in series whereby the magnetomotive forces induced therein are additive when said motor operates as a four-pole motor, a second set of shading coils comprising a continuous conductor wound upon a portion of two diametrically opposite of said poles on the same circumferential side thereof as the shading coils of said first set and interconnected in series whereby the magnetomotive forces induced therein are in opposition when said motor operates as a four-pole motor, said first set of shading coils being magnetically opposed and said second set of shading coils being magnetically additive when said motor operates as a two-pole motor.

9. A reversible motor having a four-pole stator, energizing coils for said poles connected to magnetize said poles with alternate polarities in a circumferential direction whereby said motor operates as a four-pole motor in one direction, switch means connected to two adjacent of said energizing coils for reversing the polarities therein whereby said poles become magnetized with like polarity in circumferential adjacent pairs to operate as a two-pole motor in the relatively opposite direction, a first set of shading coils comprising a continuous conductor wound upon a portion of each pole on like circumferential sides of said poles and interconnected in series whereby the magnetomotive forces induced therein are additive when said motor operates as a four-pole motor, a second set of shading coils comprising a continuous conductor wound upon a portion of two diametrically opposite poles on the opposite circumferential sides of said poles from the shading coils of said first set, said second set of shading coils interconnected in series whereby the magnetomotive forces induced therein are in opposition when said motor operates as a four-pole motor, said first set of shading coils being magnetically opposed and said second set of shading coils being magnetically additive when said motor operates as a two-pole motor.

10. A two-speed electric motor having a four-pole stator, energizing coils for said poles connected to magnetize said poles with alternate polarities in a circumferential direction whereby said motor operates as a four-pole motor at one speed, switch means connected to two adjacent of said energizing coils for reversing the polarities therein whereby said poles become magnetized with like polarity in circumferentially adjacent pairs to operate as a two-pole motor at another speed, a first pair of shading coils comprising short-circuited conductors encircling portions of two diametrically opposite poles on the same circumferential side of said poles, a second pair of shading coils mounted upon the same poles as said first set and comprising a continuous conductor wound upon the same circumferential sides of both said poles and interconnected whereby the magnetomotive forces thereof are in opposition when said motor operates as a four-pole motor, a third pair of shading coils comprising a continuous conductor wound upon portions of the two other said poles on like circumferential sides thereof and interconnected whereby their magnetomotive forces are additive when said motor operates as a four-pole motor, said second pair of shading coils being magnetically additive and said third pair of shading coils being magnetically opposed when said motor operates as a two-pole motor.

11. A two-speed electric motor having a four-pole stator, energizing coils for said poles connected to magnetize said poles with alternate polarities in a circumferential direction whereby said motor operates as a four-pole motor at one speed, switch means connected to two adjacent of said energizing coils for reversing the polarities therein whereby said poles become magnetized with like polarity in circumferentially adjacent pairs to operate as a two-pole motor at another speed, a pair of shading coils comprising short-circuited conductors encircling portions of two diametrically opposite poles on the same circumferential sides of said poles, at least one pair of interconnected shading coils comprising a continuous conductor wound upon portions of the two remaining opposite poles on like circumferential sides of said poles, said pair of shading coils being interconnected whereby the magnetomotive forces induced therein are additive when said motor operates as a four-pole motor and are opposed when said motor operates as a two-pole motor.

References Cited in the file of this patent

UNITED STATES PATENTS 2,341,482    Stephen _____ Feb. 8, 1944